(No Model.) 2 Sheets—Sheet 1.

A. A., A. F. & E. G. SUSTINS.
ROUNDABOUT.

No. 570,739. Patented Nov. 3, 1896.

Witnesses:
Geo. W. Young.
N. E. Oliphant.

Inventors
Alfred A. Sustins
Arthur F. Sustins
Ernest G. Sustins
By H. G. Underwood
Attorneys.

(No Model.) 2 Sheets—Sheet 2.

A. A., A. F. & E. G. SUSTINS.
ROUNDABOUT.

No. 570,739. Patented Nov. 3, 1896.

Witnesses:
Geo. W. Young.
N. E. Oliphant.

Inventors:
Alfred A. Sustins
Arthur F. Sustins
Ernest G. Sustins
By H. G. Underwood
Attorneys

THE NORRIS PETERS CO., PHOTO-LITHO., WASHINGTON, D. C.

UNITED STATES PATENT OFFICE.

ALFRED A. SUSTINS, ARTHUR F. SUSTINS, AND ERNEST G. SUSTINS, OF STEVENS POINT, WISCONSIN.

ROUNDABOUT.

SPECIFICATION forming part of Letters Patent No. 570,739, dated November 3, 1896.

Application filed August 23, 1895. Serial No. 560,219. (No model.)

*To all whom it may concern:*

Be it known that we, ALFRED A. SUSTINS, ARTHUR F. SUSTINS, and ERNEST G. SUSTINS, citizens of the United States, and residents of Stevens Point, in the county of Portage and State of Wisconsin, have invented certain new and useful Improvements in Roundabouts; and we do hereby declare that the following is a full, clear, and exact description thereof.

Our invention has for its main object to provide a roundabout embodying a stationary endless track or tracks, together with practical bicycles, such as may be had in open market and utilized on or off said track or tracks without change in their construction.

A further object of our invention is to provide a movable platform supported by the bicycles to travel therewith, the motive power being a result of pedaling by riders of the bicycles, the action of suitable machinery, or the combination of manual and mechanical power, as may be found most convenient or desirable.

In view of the foregoing our invention consists in certain peculiarities of construction and combination of parts hereinafter set forth with reference to the accompanying drawings and subsequently claimed.

Figure 1:
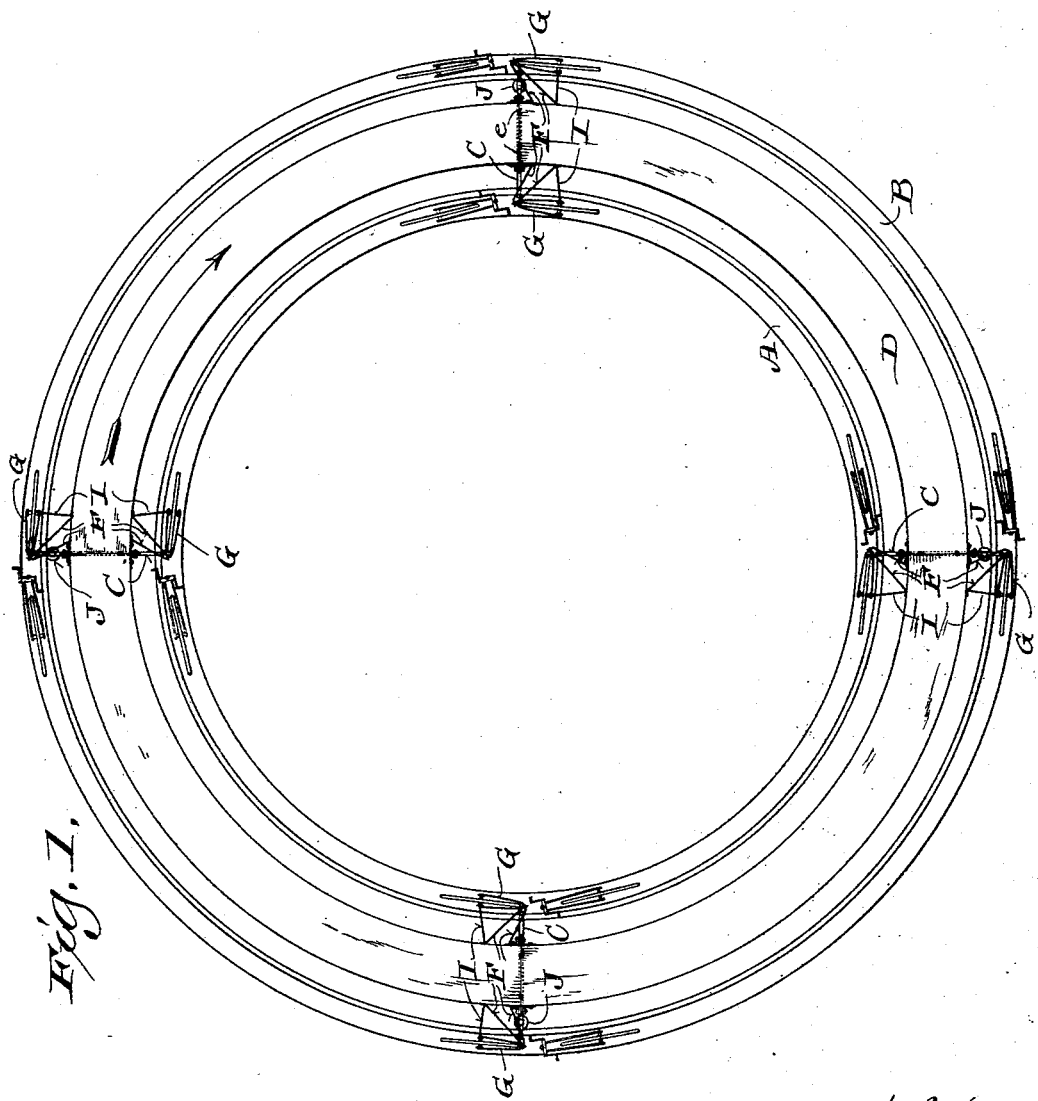
Figure 3:
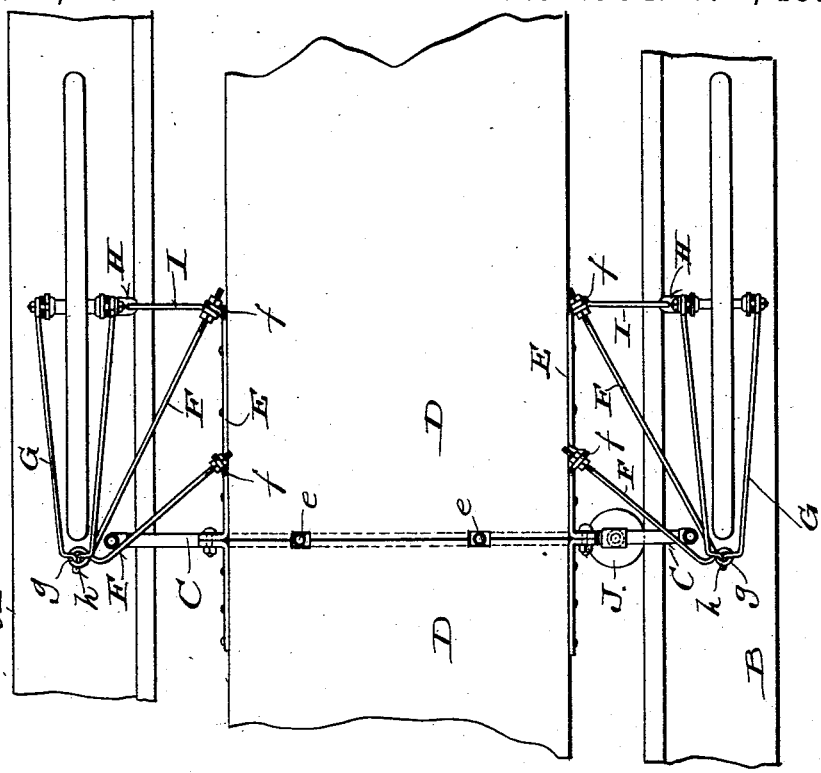
Figure 2:
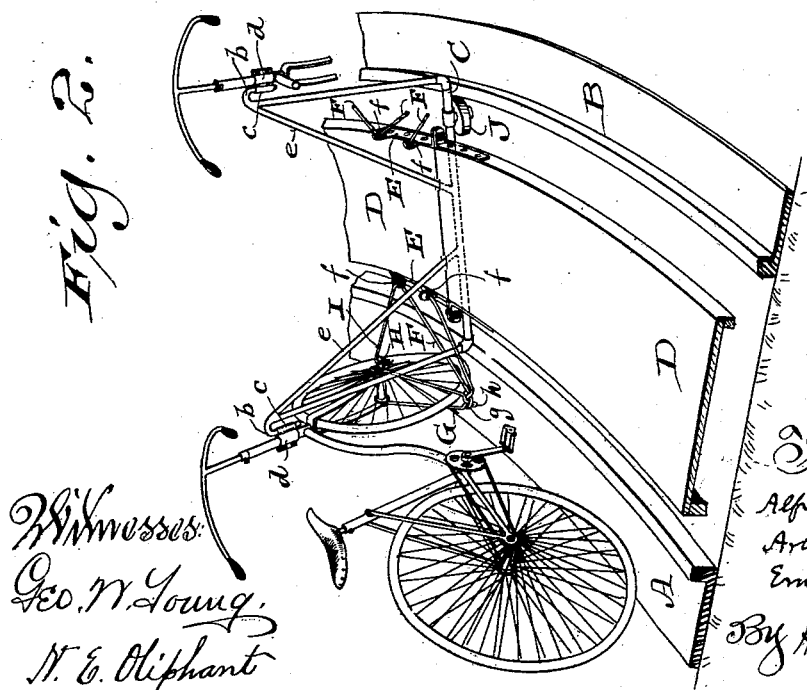

In the drawings, Figure 1 is a diagram of our improved roundabout; Fig. 2, a perspective view of a portion of the same; Fig. 3, a plan view, partly in horizontal section, showing the relative arrangement and connections of parts involved in said roundabout.

Referring by letter to the drawings, A represents an inner and B an outer stationary endless track that may be of circular or other desirable contour. Mounted on each track at suitable intervals apart are bicycles such as may be had in open market, and which require no change in their construction to make them suitable for our purpose, nor does the style of frame make any difference, as we propose to utilize both diamond and drop-frame bicycles.

As herein shown, we pair the bicycles on the inner track with those on the outer track by means of coupling-yokes C, having bent extremities b, that loosely engage sockets c, constituting parts of clamps d, arranged on the head-tubes of said bicycles.

Supported on the bicycle-connecting yokes C, intermediate of the tracks A B, is an endless platform comprising a series of sections D, having their extremities provided with angular edge plates, the outturned ends of those belonging to one section being bolted to like ends of those on the adjacent sections, and it will be seen that the meeting ends of said sections are notched to give clearance for braces e, constituting parts of said yokes.

The edge plates E at one extremity of each platform-section are provided with apertured lugs f, and rods F, bent to form eyes g, have screw-threaded ends engaged with said lugs, nuts being run on said rods to maintain the engagement just specified.

Yokes G have apertured extremities that engage with front axles of the bicycles, and the bends of the yokes have lug extensions h, engaging the eyes g aforesaid. Brackets H, also maintained on the front axles of the bicycles, are connected by braces I with ends of the rods F, and by means of those rods, the yokes, brackets, and braces said bicycles are maintained in upright position on the aforesaid tracks and their front wheels held against steering.

As a means for centering the platform above specified and preventing centrifugal movement of the bicycles, we suspend horizontal rollers J from the yokes C and arrange them to bear against the inner edge of the outer track.

From the foregoing it will be seen that the motive power for the roundabout may result from the propulsion of the bicycles constituting parts of the same, but mechanical power may be utilized and supplemented by manual power. It will also be understood that the platform carried by the bicycles may be utilized for the support of chairs or other contrivances to thereby increase the capacity of the roundabout.

Having now fully described our invention, what we claim as new, and desire to secure by Letters Patent, is—

1. A roundabout comprising concentric stationary endless tracks, practical bicycles mounted on the tracks, clamps attachable to head-tubes of the bicycles, yokes connecting the clamps in pairs, and antisteering-guards for the front wheels of said bicycles.

2. A roundabout comprising concentric stationary endless tracks, practical bicycles mounted on the tracks, clamps attachable to head-tubes of the bicycles, yokes connecting the clamps in pairs, a platform supported by the yokes, and antisteering-guards for the front wheels of said bicycles.

3. A roundabout comprising concentric stationary endless tracks, practical bicycles mounted on the tracks, clamps attachable to head-tubes of the bicycles, yokes connecting the clamps in pairs, a platform supported by the aforesaid yokes, other yokes attachable at their ends to front axles of said bicycles and having their bends provided with lug extensions, rods bent to form eyes engaging said extensions of the latter yokes, edge plates on the platform provided with apertured lugs engaged by the ends of the rods, brackets also attachable to said front axles, and braces connecting the brackets and said rods.

4. A roundabout comprising concentric stationary endless tracks, practical bicycles mounted on the tracks, clamps attachable to head-tubes of the bicycle, yokes connecting the clamps in pairs, and rollers suspended from the yokes to bear against the inner edge of the outer track.

In testimony that we claim the foregoing we have hereunto set our hands as follows: one of us at Stevens Point, in the county of Portage and State of Wisconsin, and two of us at Waupun, in the county of Fond du Lac and State of Wisconsin, in the presence of witnesses.

ALFRED A. SUSTINS.
ARTHUR F. SUSTINS.
ERNEST G. SUSTINS.

Witnesses to signature of Alfred A. Sustins:
JOHN R. McDONALD,
S. HUTTER.

Witnesses to signatures of Arthur F. Sustins and Ernest G. Sustins:
D. R. AMADON,
D. W. SCOTT.